(No Model.) 2 Sheets—Sheet 1.

J. M. DODGE.
COMPENSATING GEARING FOR CONVEYERS.

No. 534,098. Patented Feb. 12, 1895.

Witnesses:
R. Schlicher
F. Benner

Inventor:
James M. Dodge
by his Attorneys
Hinson & Howen (No Model.)  2 Sheets—Sheet 2.

J. M. DODGE.
COMPENSATING GEARING FOR CONVEYERS.

No. 534,098. Patented Feb. 12, 1895.

Witnesses:
R. Schleicher
J. Benner

Inventor:
James M. Dodge
by his Attorneys
Howson & Howson

UNITED STATES PATENT OFFICE.

JAMES M. DODGE, OF PHILADELPHIA, PENNSYLVANIA, ASSIGNOR TO THE LINK BELT ENGINEERING COMPANY, OF SAME PLACE.

COMPENSATING GEARING FOR CONVEYERS.

SPECIFICATION forming part of Letters Patent No. 534,098, dated February 12, 1895.

Application filed November 1, 1894. Serial No. 527,640. (No model.)

*To all whom it may concern:*

Be it known that I, JAMES M. DODGE, a citizen of the United States, residing in Philadelphia, Pennsylvania, have invented certain Improvements in Compensating Gearing for Conveyers, of which the following is a specification.

The object of my invention is to equalize the strain placed upon the chain or bars of a conveyer, and to obviate the intermittent movement of the conveyer when driven from a chain or sprocket wheel which is of necessity polygonal. This object I attain in the manner hereinafter set forth, reference being had to the accompanying drawings, in which—

Figure 1:
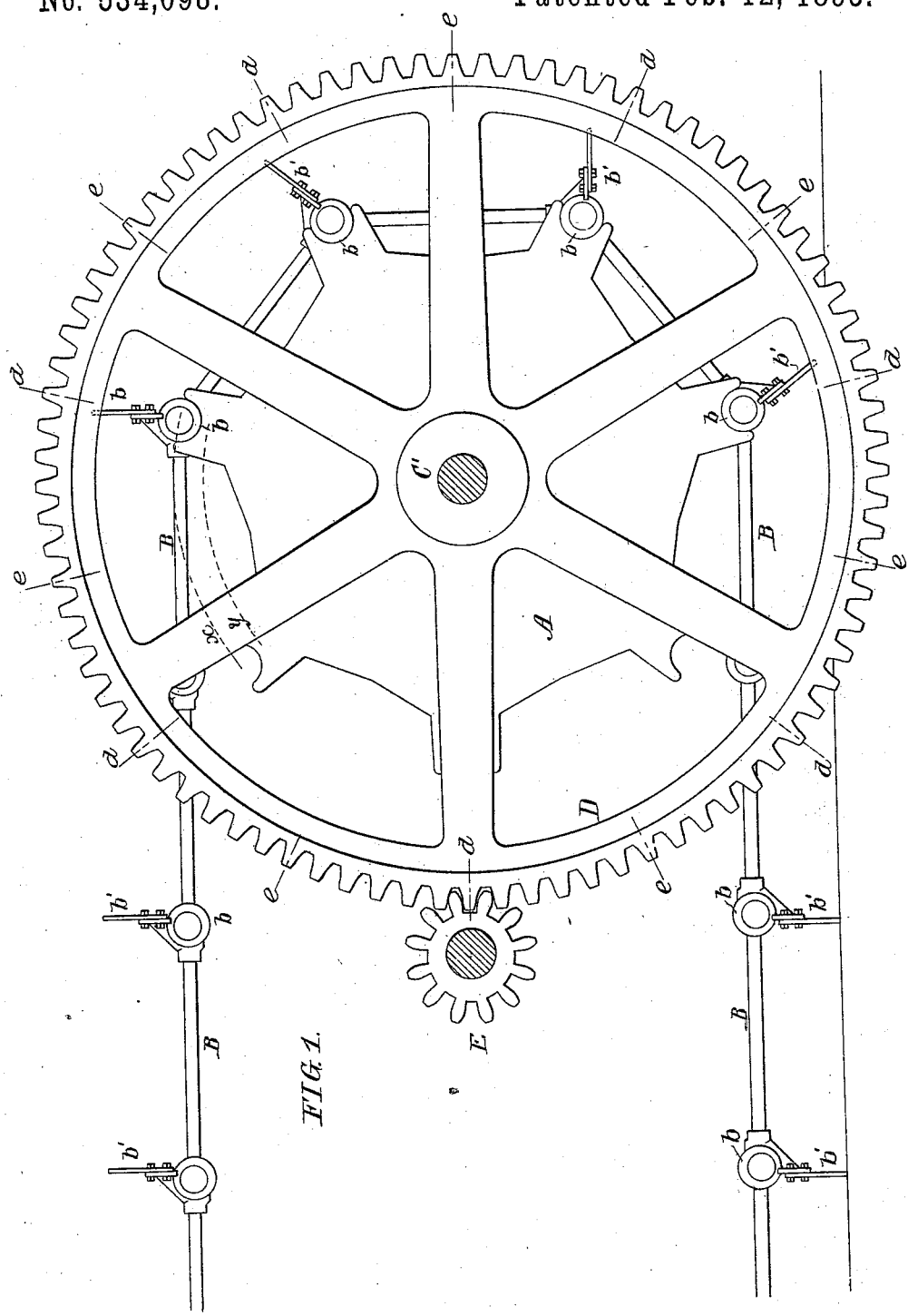
Figure 3:
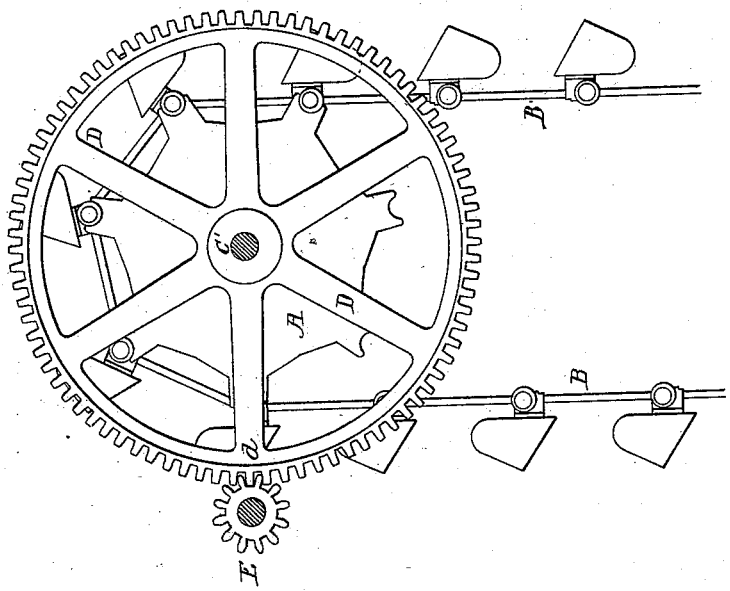
Figure 2:
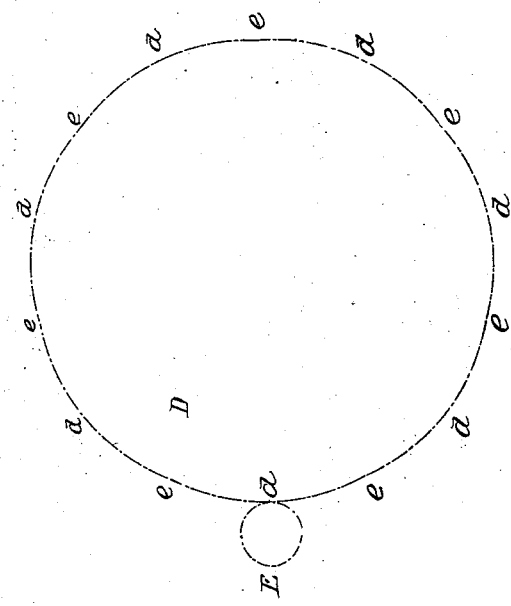

Figure 1, is a side view of sufficient of a flight conveyer to illustrate my invention. Fig. 2, is a diagram view; and Fig. 3, is a side view of the driving end of a bucket conveyer.

In all conveyers in which one part of the driving wheel is farther away from the center than another, as illustrated in Fig. 1, for instance, and where the shaft is driven at a uniform speed, the conveyer chain is driven first at one speed, then at another, and if, for instance, a conveyer is two hundred feet long and each flight is pushing a load before it, this change of speed places an enormous strain upon the conveyer chain or bars.

Referring in the first instance, to Figs. 1 and 2, which illustrate a driving wheel A having seven pockets for the reception of the joint sockets $b$ of the conveyer chain B, this chain has a series of flights $b'$ in the present instance, one at each joint, and it will be seen that as the wheel turns the speed of the chain will vary fourteen times during each revolution, the radial control of the chain alternating from the line $x$ to the line $y$, Fig. 1, the line $x$ being through the articulated joint and the line $y$ being through a point at the center of the link, and as this motion is equivalent to a start and stop fourteen times in a revolution, it will be seen that the strain is very great, causing the chain to break constantly unless it is made extra heavy to overcome the strain.

I mount on the shaft C which carries the chain wheel A, a gear wheel D which has as many elevated points $d$ as the wheel A, seven in the present instance, and gearing with this wheel D is a pinion E so proportioned as to properly mesh with said wheel D. The wheels A and D are so set in respect to each other that when the chain takes the low part of the wheel A the low portion $e$ of the wheel D is in gear with the pinion and consequently the wheel A is driven at an increased speed. The pitch line of the wheel D is so proportioned that the chain will be moved forward at a uniform speed.

It will be understood that my invention can be applied to other conveyers than those having flights, as for instance in Fig. 3, I have illustrated a bucket elevator to which my invention is applied, and in some cases the gear wheel D may be on an intermediate shaft geared to the shaft C, and the chain wheel A may have more or less than seven elevated points, without departing from my invention.

I claim as my invention—

1. The combination of a conveyer chain, a driven chain wheel through which motion is given to the chain, a driving shaft, with a compensating device between the driving shaft and wheel, whereby the chain is moved continuously forward at a given speed.

2. The combination of a conveyer chain, a chain wheel, a shaft, an irregular gear and a pinion driving said gear, said gear being so timed with the chain wheel that the chain is moved continuously forward at a given speed.

In testimony whereof I have signed my name to this specification in the presence of two subscribing witnesses.

JAMES M. DODGE.

Witnesses:
 WILL. A. BARR,
 JOSEPH H. KLEIN.